US009876260B2

(12) United States Patent
Kim et al.

(10) Patent No.: US 9,876,260 B2
(45) Date of Patent: Jan. 23, 2018

(54) BATTERY MODULE

(71) Applicant: Samsung SDI Co., Ltd., Yongin-si, Gyeonggi-do (KR)

(72) Inventors: Sukkyum Kim, Yongin (KR); Dongjin Park, Yongin (JP)

(73) Assignee: SAMSUNG SDI CO., LTD., Yongin-si (KR)

( * ) Notice: Subject to any disclaimer, the term of this patent is extended or adjusted under 35 U.S.C. 154(b) by 229 days.

(21) Appl. No.: 14/970,407

(22) Filed: Dec. 15, 2015

(65) Prior Publication Data

US 2016/0218388 A1    Jul. 28, 2016

(30) Foreign Application Priority Data

Jan. 23, 2015  (KR) .................. 10-2015-0011386

(51) Int. Cl.
*H01M 2/02* (2006.01)
*H01M 10/42* (2006.01)
*H01M 2/10* (2006.01)

(52) U.S. Cl.
CPC ..... *H01M 10/4257* (2013.01); *H01M 2/1077* (2013.01); *H01M 2220/20* (2013.01)

(58) Field of Classification Search
CPC .......... H01M 10/4257; H01M 2/1077; H01M 2220/20
See application file for complete search history.

(56) References Cited

U.S. PATENT DOCUMENTS

| 2005/0255342 A1 | 11/2005 | Lee et al. |
| 2010/0112424 A1 | 5/2010 | Hayashi |
| 2013/0244068 A1 | 9/2013 | Kuroda |

(Continued)

FOREIGN PATENT DOCUMENTS

| JP | H05-193366 A | 8/1993 |
| JP | 2004-227926 A | 8/2004 |
| JP | 2008-192551 | 8/2008 |

(Continued)

OTHER PUBLICATIONS

Korean Office Action dated Nov. 30, 2015 in Korean Patent Application No. 10-2015-0011386.

*Primary Examiner* — Cynthia K Walls
(74) *Attorney, Agent, or Firm* — Knobbe Martens Olson & Bear LLP

(57) ABSTRACT

A battery module having a minimized size is provided. The battery module includes a secondary battery unit including a plurality of secondary batteries arranged with a predetermined interval in horizontal and vertical directions, a compression plate wrapping an exterior portion of the secondary battery unit and compressing the secondary battery unit with a predetermined pressure, and a housing accommodating the secondary battery unit combined with the compression plate, the housing including one or more bolt fastening units corresponding to portions between the plurality of secondary batteries arranged in the horizontal direction and protruding from a bottom surface of the housing and one or more bolts fastened with the one or more bolt fastening units by way of the portions between the plurality of secondary batteries arranged in the horizontal direction while passing through the compression plate.

20 Claims, 3 Drawing Sheets

(56) References Cited

U.S. PATENT DOCUMENTS

2014/0242427 A1* 8/2014 Tanaka ................ H01M 2/1072
                                                              429/61

FOREIGN PATENT DOCUMENTS

| JP | 2011-071097 A | 4/2011 |
|----|---------------|--------|
| JP | 2013-196827 | 9/2013 |
| KR | 20050108432 | 11/2005 |
| KR | 2013-0010735 A | 1/2013 |
| KR | 2015-0000090 A | 1/2015 |

* cited by examiner

BATTERY MODULE

RELATED APPLICATIONS

This application claims priority from Korean Patent Application No. 10-2015-0011386 filed on 23 Jan., 2015, in the Korean Intellectual Property Office, and all the benefits accruing therefrom under 35 U.S.C. 119, the contents of which in its entirety are herein incorporated by reference.

BACKGROUND

Field

The present invention relates to a battery module.

Description of the Related Art

Secondary batteries are quite easy to be applied by product group, have advantageous electrical properties, such as high energy density, and are widely applied to not only portable devices but also electric vehicles (EVs) or hybrid electric vehicles (HEVs), which are driven by electric power. In particular, since secondary batteries applied to the electric vehicles EVs are in the form of a module that is mounted at a relatively narrow space, like a space under the driver seat or a space of a car trunk provided for a spare tire, they need to be fabricated to a reduced or even a minimized size.

SUMMARY OF CERTAIN INVENTIVE ASPECTS

The present invention provides a battery module having a minimized size.

The above and other objects of the present invention will be described in or be apparent from the following description of the preferred embodiments.

According to an aspect of the present invention, there is provided a battery module includes a secondary battery unit including a plurality of secondary batteries arranged with a predetermined interval in horizontal and vertical directions, a compression plate wrapping an exterior portion of the secondary battery unit and compressing the secondary battery unit with a predetermined pressure, and a housing accommodating the secondary battery unit combined with the compression plate, the housing including one or more bolt fastening units corresponding to portions between the plurality of secondary batteries arranged in the horizontal direction and protruding from a bottom surface of the housing and one or more bolts fastened with the one or more bolt fastening units by way of the portions between the plurality of secondary batteries arranged in the horizontal direction while passing through the compression plate.

The battery module may further include a fixing cover unit positioned between the secondary battery unit and the compression plate and covering the secondary battery unit to fix positions of the plurality of secondary batteries.

The fixing cover unit may include a top cover covering a top portion of the secondary battery unit and including a first barrier for separating the plurality of secondary batteries arranged in the horizontal direction from each other by a predetermined distance, a bottom cover covering a bottom portion of the secondary battery unit and including a second barrier for separating the plurality of secondary batteries arranged in the horizontal direction from each other, and a third barrier coupled between the top cover and the bottom cover and separating the plurality of secondary batteries arranged in the vertical direction from each other by a predetermined distance.

Bolt through holes through which the bolts pass may be formed on a top portion of the compression plate, the first barrier, the second barrier and the third barrier, respectively, fastening unit through holes through which the bolt fastening units pass may be formed on a bottom portion of the compression plate, and fastening unit insertion holes into which the bolt fastening units are inserted may be formed on the second barrier.

The compression plate may include an upper compression plate compressing the secondary battery unit while covering the top portion of the secondary battery unit, and a lower compression plate combined with the upper compression plate and compressing the secondary battery unit while covering the bottom portion of the secondary battery unit.

The upper compression plate and the lower compression plate may be welded at opposite ends of the secondary battery unit to then be combined with each other.

Opposite ends of the upper compression plate may be stepwise bent, and opposite ends of the lower compression plate may be welded to the opposite ends of the upper compression plate in a state in which the opposite ends of the lower compression plate are positioned at interior sides of the opposite ends of the upper compression plate.

An adhesive layer for adhering the secondary battery unit combined with the compression plate to the housing may be formed on a bottom surface of the housing.

The adhesive layer may be shaped of a line bent at least one time to maximize a contact area between the compression plate and the bottom surface of the housing.

The battery module may further include a protection circuit unit electrically connected to the secondary battery unit, wherein the housing accommodates the protection circuit unit and includes aluminum.

As described above, the battery module according to the embodiment of the present may have a minimized size.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF CERTAIN INVENTIVE EMBODIMENTS

Hereinafter, a battery module according to an embodiment of the present invention will be described with reference to FIGS. 1 to 5.

Figure 1:
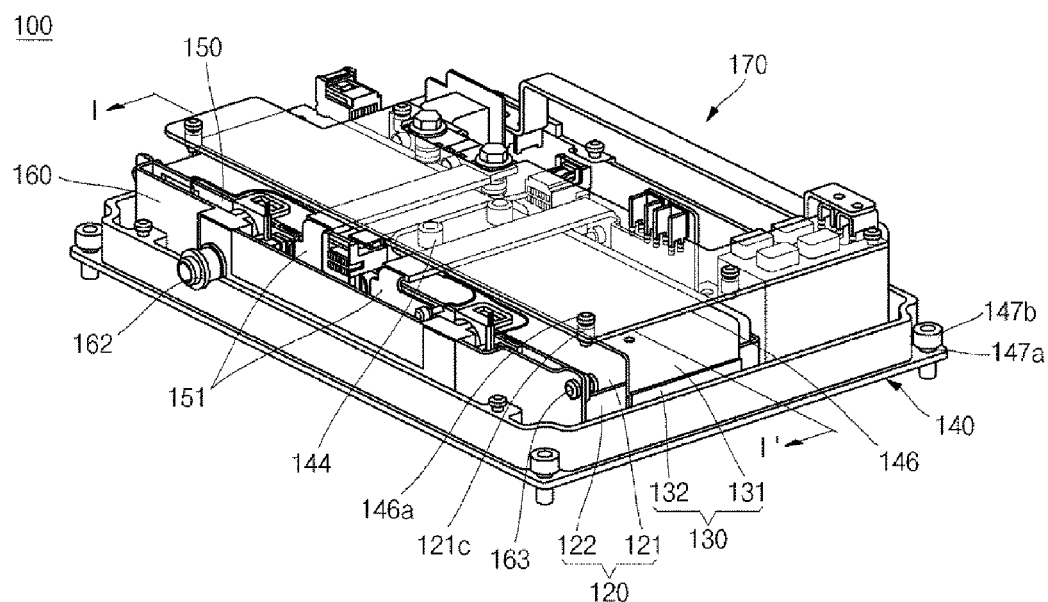
FIG. 1 is a perspective view of a battery module according to an embodiment of the present invention.
Figure 2:
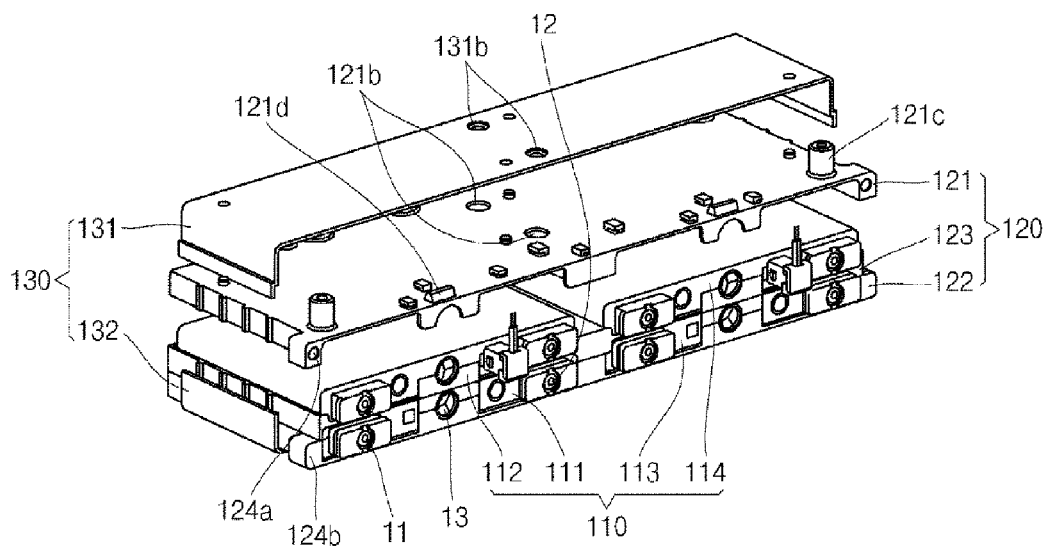
FIG. 2 is an exploded perspective view illustrating a secondary battery unit, a cover unit and a compression unit according to an embodiment of the present invention.
Figure 3:
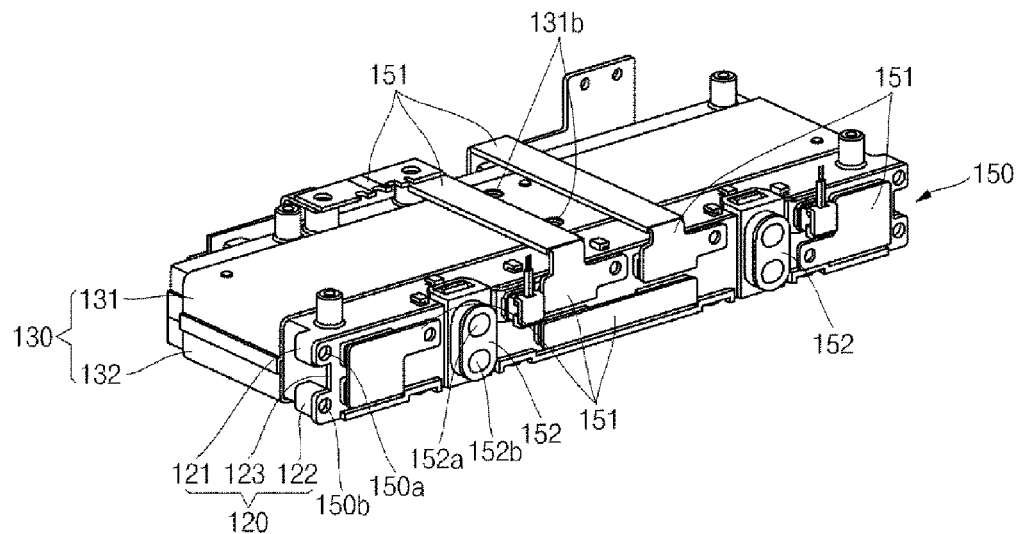
FIG. 3 is a perspective view illustrating a busbar holder, busbars and a gas release assembly assembled with the secondary battery unit illustrated in FIG. 2.
Figure 4:
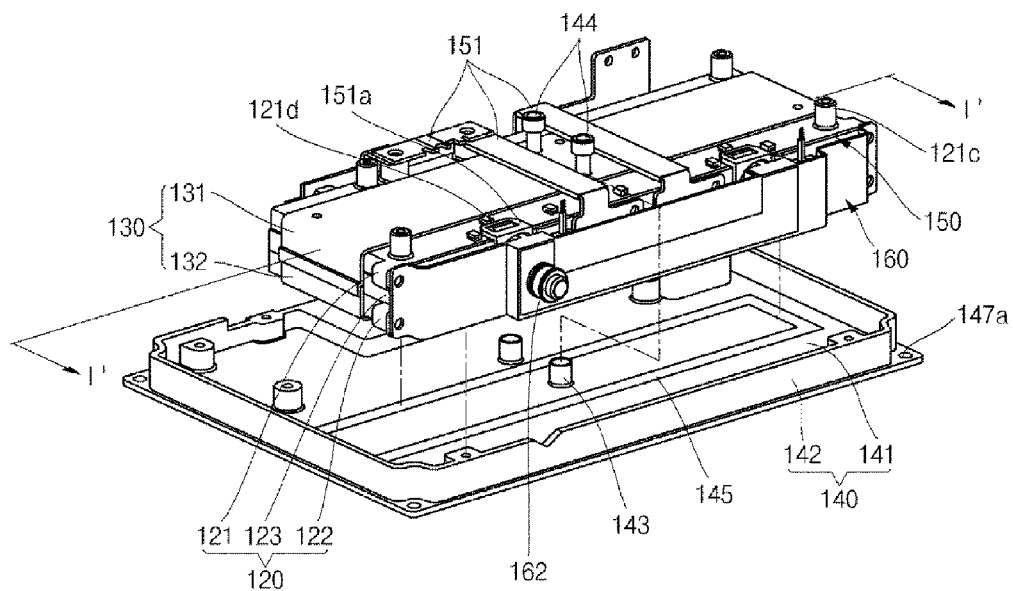
FIG. 4 is a perspective view illustrating a housing, an insulation cover vent and a hole member assembled with the secondary battery unit illustrated in FIG. 3.
Figure 5:
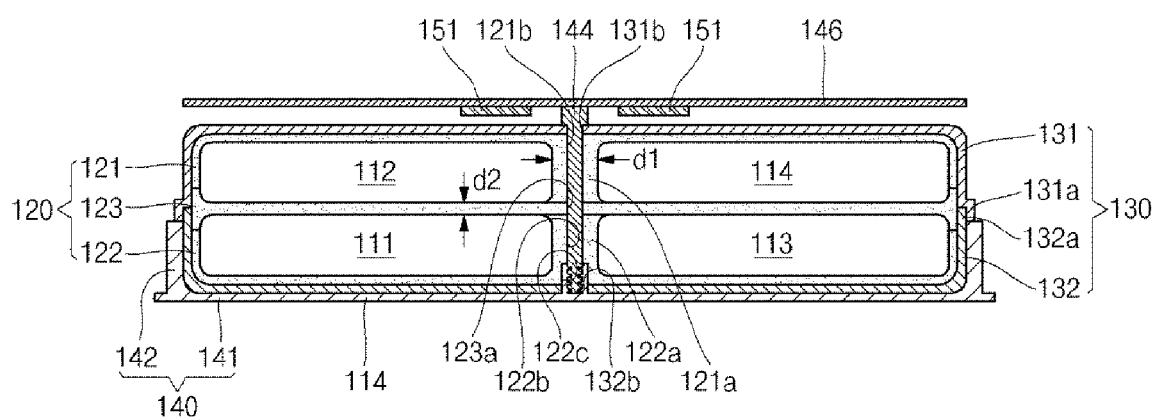
FIG. 5 is a cross-sectional view taken along the line I-I' of FIG. 1.

FIG. 1 is a perspective view of a battery module according to an embodiment of the present invention, FIG. 2 is an exploded perspective view illustrating a secondary battery unit, a cover unit and a compression unit according to an embodiment of the present invention, FIG. 3 is a perspective view illustrating a busbar holder, busbars and a gas release assembly assembled with the secondary battery unit illustrated in FIG. 2, FIG. 4 is a perspective view illustrating a housing, an insulation cover vent and a hole member assembled with the secondary battery unit illustrated in FIG. 3, and FIG. 5 is a cross-sectional view taken along the line I-I' of FIG. 1.

Referring to FIGS. 1 to 5, the battery module 100 according to an embodiment of the present invention may include a secondary battery unit 110, a fixing cover unit 120, a compression plate 130, a housing 140, a busbar holder 150, an insulation cover 160 and a protection circuit unit 170.

As illustrated in FIGS. 2 and 5, the secondary battery unit 110 may include a plurality of secondary batteries 111a, 111b, 112a, and 112b arranged with predetermined distances d1 and d2 in horizontal (X-axis) and vertical (Z-axis) directions. In the following description, for a battery understanding of a battery arrangement structure of the secondary battery unit 110, the battery arrangement structure will be described using a matrix.

As illustrated in FIGS. 2 and 5, the secondary battery unit 110 may include a plurality of secondary batteries 111, 112, 113, and 114 arranged with predetermined distances d1 and d2 (FIG. 5) in horizontal (X-axis) and vertical (Z-axis) directions. In the following description, for a battery understanding of a battery arrangement structure of the secondary battery unit 110, the battery arrangement structure will be described using a matrix.

The secondary battery unit 110 may include first to fourth secondary batteries 111, 112, 113, and 114. In the secondary battery unit 110, the first secondary battery 111 may be arranged in the first row and the first column. The second secondary battery 112 may be arranged in the second row and the first column. The third secondary battery 113 may be arranged in the first row and the second column. The fourth secondary battery 114 may be arranged in the second row and the second column.

The first and third secondary batteries 111 and 113, and the second and fourth secondary batteries 112 and 114, are arranged in the horizontal direction and spaced apart a predetermined distance d1 apart from each other. In addition, the first and second secondary batteries 111 and 112, and the second and fourth secondary batteries 113 and 114, are arranged in the vertical direction and spaced apart a predetermined distance d2 apart from each other.

Each of the first to fourth secondary batteries 111, 112, 113, and 114 may be shaped of a substantially rectangular parallelepiped including first and second electrode terminals 11 and 12 and a safety vent 13, and may be arranged in a lying position. However, the embodiment of the present invention does not particularly limit the arrangement structure of the secondary battery to that disclosed herein. Accordingly, the secondary battery according to the embodiment of the present invention may have any type of a prismatic secondary battery known in the related art.

The fixing cover unit 120 may include a top cover 121, a lower cover 122 and a third barrier 123.

The top cover 121 may cover a top portion of the secondary battery unit 110. A first barrier 121a may be formed in the top cover 121. The first barrier 121a may separate the second and fourth secondary batteries 112 and 114 arranged in the horizontal direction from each other by the predetermined distance d1. For example, the first barrier 121a may protrude from the top cover 121 to then be positioned between the second and fourth secondary batteries 112 and 114. Therefore, the first barrier 121a may firmly fix positions of the second and fourth secondary batteries 112 and 114 to be maintained at the predetermined distance d1 without being separated from each other in a direction in which they face each other (i.e., in the X-axis direction). A first bolt through hole 121b passing through the first barrier 121a may be formed in the top cover 121.

The bottom cover 122 may cover a bottom portion of the secondary battery unit 110. A second barrier 122a may be formed in the bottom cover 122. The second barrier 122a may separate the first and third secondary batteries 111 and 113 arranged in the horizontal direction from each other by the predetermined distance d1. For example, the second barrier 122a may protrude from the bottom cover 122 to then be positioned between the first and third secondary batteries 111 and 113. Therefore, the second barrier 122a may firmly fix positions of the first and third secondary batteries 111 and 113 to be maintained at the predetermined distance d1 without being separated from each other in a direction in which they face each other (i.e., in the X-axis direction). A second bolt through hole 122b passing through the second barrier 122a may be formed in the bottom cover 122. In addition, a bolt insertion groove 122c connected to the second bolt through hole 122b may be formed in the bottom cover 122. Bolt fastening units 143 protruding from a bottom surface 141 of the housing 140 may be inserted into the bolt insertion groove 122c.

The third barrier 123 may be coupled between the top cover 121 and the bottom cover 122. Accordingly, the third barrier 123 may separate the first and second secondary batteries 111 and 112 and the third and fourth secondary batteries 113 and 114 arranged in the vertical direction from each other by a predetermined distance d2. A third bolt through hole 123a may be formed in the third barrier 123. The third bolt through hole 123a may correspond to each of the first and second through holes 121b and 122b and may connect the first and second through holes 121b and 122b to each other.

As described above, the fixing cover unit 120 may cover the first to fourth secondary batteries 111, 112, 113, and 114 to fix arranged positions of the first to fourth secondary batteries 111, 112, 113, and 114. In addition, the fixing cover unit 120 may prevent unnecessary electrical contacts between each of the first to fourth secondary batteries 111, 112, 113, and 114 and may be made of an insulating material having a predetermined elastic force for securing a swelling space during volumetric expansion of the first to fourth secondary batteries 111, 112, 113, and 114. For example, portions of the fixing cover unit 120, for separating at least the first to fourth secondary batteries 111, 112, 113, and 114 from each other, may provide the swelling space during volumetric expansion of the first to fourth secondary batteries 111, 112, 113, and 114.

Further, the fixing cover unit 120 may be configured to electrically connect the first to fourth secondary batteries 111, 112, 113, and 114 to the protection circuit unit 170 and to have an open portion of a front side (Y-axis direction) to release gases.

The compression plate 130 may include an upper compression plate 131 and a lower compression plate 132. The compression plate 130 may be formed along the outer surface of the secondary battery unit 110 accommodated in the fixing cover unit 120 in a band shape and may compress the secondary battery unit 110 with a predetermined pressure.

The upper compression plate 131 may compress the secondary battery unit 110 while covering the top portion of the secondary battery unit 110. For example, the upper compression plate 131 may be bent to cover first side portions, top surfaces and second side portions of the second and fourth secondary batteries 112 and 114. A fourth bolt through hole 131*b* located to correspond to the first bolt through hole 121*b* may be formed in the upper compression plate 131.

The lower compression plate 132 may compress the secondary battery unit 110 while covering a bottom portion of the secondary battery unit 110. For example, the lower compression plate 132 may be bent to cover first side portions, top surfaces and second side portions of the first and third secondary batteries 111 and 113. Fastening unit through holes 132*b* located to correspond to fastening unit insertion holes 122*c* may be formed in the lower compression plate 132. The bolt fastening units 143 may pass through the fastening unit through holes 132*b*.

The compression plate 130 may compress the secondary battery unit 110 with a predetermined pressure, thereby increasing coupling forces between each of the first to fourth secondary batteries 111, 112, 113, and 114. In addition, the compression plate 130 may compress the secondary battery unit 110 in horizontal and vertical directions, thereby minimizing the overall thickness and width of the secondary battery unit 110.

Opposite ends 131*a* of the upper compression plate 131 may be stepwise bent. Accordingly, opposite ends 132*a* of the lower compression plate 132 may be welded to the opposite ends 131*a* of the upper compression plate 131 in a state in which the opposite ends of the lower compression plate 132 are positioned at interior sides of the opposite ends of the upper compression plate 131.

The opposite ends 131*a* of the upper compression plate 131 are stepwise bent to increase contact areas between the opposite ends 131*a* of the upper compression plate 131 and the opposite ends 132*a* of the lower compression plate 132, which may increase welding areas, thereby more firmly coupling the upper compression plate 131 with the lower compression plate 132.

The upper compression plate 131 and the lower compression plate 132 may be made of a metal having high heat conductivity for facilitating welding and heat dissipation of the secondary battery unit 110.

The housing 140 may accommodate the fixing cover unit 120 and the secondary battery unit 110 and may be configured to be more firmly fastened with the secondary battery unit 110. To this end, the housing 140 may include a bottom surface 141, a plurality of sidewalls 142 connected to edges of the bottom surface 141, bolt fastening units 143, bolts 144 and an adhesive layer 145.

The bolt fastening units 143 may be formed on the bottom surface 141 of the housing 140 and may be configured to upwardly protrude. A thread may be formed on an internal surface of each of the bolt fastening units 143.

Each of the bolts 144 may sequentially pass the fourth bolt through hole 131*b*, the first bolt through hole 121*b*, the third bolt through hole 123*a* and the second bolt through hole 122*b* in that order to then be fastened with the bolt fastening units 143. A thread is formed at an end of each of the bolts 144 to then be engaged with the thread of each of the bolt fastening units 143.

As described above, the bolt fastening units 143 and bolts 144 may more firmly fasten the secondary battery unit 110 assembled by the fixing cover unit 120 and the compression plate 130 with the housing 140. In addition, the bolt fastening units 143 and the bolts 144 are formed to traverse the center of the secondary battery unit 110, thereby minimizing the number of components, compared to a case where the bolt fastening units 143 and the bolts 144 are formed at outer opposite sides of the secondary battery unit 110, and fixing the secondary battery unit 110 to the housing 140 in a more balanced manner. In addition, as the number of components for the bolt fastening units 143 and bolts 144 is minimized, space utilization efficiency of a module can be improved.

The adhesive layer 145 is formed on the bottom surface 141 of the housing 140 to facilitate adhesion between the compression plate 130 and the housing 140. Accordingly, distortion of the secondary battery unit 110 can be inhibited or prevented. In addition, the adhesive layer 145 is shaped of a line bent at least one time to increase the contact area between the compression plate 130 and the bottom surface 141 of the housing 140, thereby allowing heat generated from the secondary battery unit 110 to be more efficiently transferred through the housing 140. Therefore, the housing 140 may be made of a metal having high heat conductivity for heat dissipation from the secondary battery unit 110. For example, the housing 140 may be made of aluminum.

Further, the housing 140 may further include a top cover 146 for protecting the top portion of the secondary battery unit 110. The top cover 146 may be fixed to the top portion of the secondary battery unit 110 such that cover fastening units 121*c* formed at four corners of a top surface of the top cover 121 are engaged with bolts 146*a*.

In addition, the housing 140 may include coupling holes 147*a* formed at its four corners to fix the battery module 100 at a particular position of a vehicle. Accordingly, the battery module 100 may be mounted on the vehicle such that through fixing bolts 147*b* are coupled to particular positions of the vehicle through the coupling holes 147*a*.

The busbar holder 150 is positioned between the secondary battery unit 110 and the insulation cover 160 and may be combined with the fixing cover unit 120 through fastening bolt units 143.

The busbars 151 and mutli-gaskets 152 may be assembled with the busbar holder 150. The busbars 151 may make electrically contact with the first and second electrode terminals 11 and 12 by coupling the busbar holder 150 to the fixing cover unit 120. Each of the multli-gaskets 152 may be coupled to a position corresponding to the safety vent 13 while passing through the busbar holder 150. The mutli-gaskets 152 may include a plurality of gas holes corresponding to the safety vents 13 of the secondary batteries arranged in the vertical direction. For example, first and second gas holes 152*a* and 152*b* may be formed in a single multi-gasket 152. Here, the first and second gas holes 152*a* and 152*b* may correspond to the safety vents 13 of the first and second secondary batteries 111 and 112 arranged in the vertical direction. In the illustrated embodiment, two gas holes provided in the single multi-gasket 152 are exemplified, but aspects of the present invention are not limited thereto. In a case where 5 secondary batteries are arranged in the vertical direction, the single multi-gasket 152 may include 5 gas holes so as correspond to safety vents of the 5 secondary batteries. The multi-gasket 152 may be made of any type of gasket materials known in the related art. In addition, a top hooking portion 151*a* and a bottom hooking portion (not shown) may be formed in the busbar holder 150. The top hooking portion 151*a* may be formed at a top end of the busbar holder 150 and the bottom hooking portion may be formed at a bottom end of the busbar holder 150. The top hooking portion 151*a* and the bottom hooking portion are vertically bent with respect to the busbar holder 150 and may extend toward the fixing cover unit 120. In addition, the top hooking portion 151*a* and the bottom hooking portion may be shaped as rings.

A top protrusion 121d may be formed on the top surface of the top cover 121 and a bottom protrusion (not shown) may be formed on the bottom surface of the bottom cover 122. Here, the top protrusion 121d may be forcibly fitted into the top hooking portion 151a and the bottom protrusion may be forcibly fitted into the bottom hooking portion. Accordingly, the top and bottom ends of the busbar holder 150 may be firmly coupled to top and bottom ends of the fixing cover unit 120, respectively.

The insulation cover 160 may be coupled to the fixing cover unit 120 to cover the busbar holder 150. For example, second top coupling holes 160a may be formed at top opposite ends of the insulation cover 160 and second bottom coupling holes 160b may be formed at bottom opposite ends of the insulation cover 160. The second top coupling holes 160a may correspond to first top coupling holes 150a and the second bottom coupling holes 160b may correspond to first bottom coupling holes 150b. Accordingly, the insulation cover 160 and the busbar holder 150 may be firmly fastened with the fixing cover unit 120 through the bolt fastening units 143.

The insulation cover 160 may be integrally formed with a duct (not shown) and may include a vent hole member 162. The duct (not shown) may allow gases released through the safety vent 13 and the mutli-gaskets 152 during gas release of the secondary battery unit 110 to be guided to the vent hole member 162.

The vent hole member 162 is connected to the duct (not shown) to release the gases guided through the duct (not shown).

The protection circuit unit 170 may be accommodated in the housing 140 and may be electrically connected to the secondary battery unit 110 through the busbars 151. The protection circuit unit 170 may control charging and discharging operations of the secondary battery unit 170 and may prevent over-charging and over-discharging. Since the protection circuit unit 170 has a configuration widely known in the related art, a detailed description thereof will not be given.

According to the embodiment of the present invention, since the fixing cover unit 120 is made of an insulating material having resilience, unnecessary electric contacts occurring in the secondary battery unit 110 may be avoided and a swelling space can be secured during volumetric expansion of the secondary battery unit 110.

In addition, according to the embodiment of the present invention, a coupling force of the secondary battery unit 110 can be increased using the compression plate 130. In addition, the secondary battery unit 110 is compressed in horizontal and vertical directions, thereby minimizing the overall size of the secondary battery unit 110.

In addition, according to the embodiment of the present invention, the secondary battery unit 110 can be more stably fixed to a particular position of a vehicle using the housing 140 and heat generated from the secondary battery unit 110 can be more effectively emitted.

In addition, according to the embodiment of the present invention, the secondary battery unit 110 can be more firmly fastened with the housing 140 using the bolt fastening units 143 and the bolts 144. Further, the bolt fastening units 143 and the bolts 144 are formed at the center of the secondary battery unit 110, thereby minimizing the number of components for coupling the secondary battery unit 110 to the housing 140. As the number of components is reduced or minimized, space utilization efficiency of a module can be improved. Further, the secondary battery unit 110 can be fixed to the housing 140 in a more balanced manner.

In addition, according to the embodiment of the present invention, the secondary battery unit 110 can be more firmly combined with the housing 140 using the adhesive layer 145, thereby preventing distortion of the secondary battery unit 110.

While the battery module according to the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A battery module comprising:
   a secondary battery unit including a plurality of secondary batteries arranged with a predetermined interval in horizontal and vertical directions;
   a compression plate wrapping an exterior portion of the secondary battery unit and compressing the secondary battery unit with a predetermined pressure; and
   a housing accommodating the secondary battery unit combined with the compression plate, the housing including one or more bolt fastening units corresponding to portions between the plurality of secondary batteries arranged in the horizontal direction and protruding from a bottom surface of the housing and one or more bolts fastened with the one or more bolt fastening units by way of the portions between the plurality of secondary batteries arranged in the horizontal direction while passing through the compression plate.

2. The battery module of claim 1, further comprising a fixing cover unit positioned between the secondary battery unit and the compression plate and covering the secondary battery unit to fix positions of the plurality of secondary batteries.

3. The battery module of claim 2, wherein the fixing cover unit comprises:
   a top cover covering a top portion of the secondary battery unit and including a first barrier for separating the plurality of secondary batteries arranged in the horizontal direction from each other by a predetermined distance;
   a bottom cover covering a bottom portion of the secondary battery unit and including a second barrier for separating the plurality of secondary batteries arranged in the horizontal direction from each other; and
   a third barrier coupled between the top cover and the bottom cover and separating the plurality of secondary batteries arranged in the vertical direction from each other by a predetermined distance.

4. The battery module of claim 3, wherein bolt through holes through which the bolts pass are formed on a top portion of the compression plate, the first barrier, the second barrier and the third barrier, respectively, fastening unit through holes through which the bolt fastening units pass are formed on a bottom portion of the compression plate, and fastening unit insertion holes into which the bolt fastening units are inserted are formed on the second barrier.

5. The battery module of claim 1, wherein the compression plate comprises:
   an upper compression plate compressing the secondary battery unit while covering the top portion of the secondary battery unit; and a lower compression plate combined with the upper compression plate and compressing the secondary battery unit while covering the bottom portion of the secondary battery unit.

6. The battery module of claim 5, wherein the upper compression plate and the lower compression plate are welded at opposite ends of the secondary battery unit to then be combined with each other.

7. The battery module of claim 6, wherein opposite ends of the upper compression plate are stepwise bent, and opposite ends of the lower compression plate are welded to the opposite ends of the upper compression plate in a state in which the opposite ends of the lower compression plate are positioned at interior sides of the opposite ends of the upper compression plate.

8. The battery module of claim 1, wherein an adhesive layer for adhering the secondary battery unit combined with the compression plate to the housing is formed on a bottom surface of the housing.

9. The battery module of claim 8, wherein the adhesive layer is shaped of a line bent at least one time to maximize a contact area between the compression plate and the bottom surface of the housing.

10. The battery module of claim 1, further comprising a protection circuit unit electrically connected to the secondary battery unit, wherein the housing accommodates the protection circuit unit and includes aluminum.

11. A battery module comprising:
a secondary battery unit including a plurality of secondary batteries arranged with a predetermined interval in a first and second direction that are orthogonal to each other;
a compression plate positioned on adjacent an exterior portion of the secondary battery unit and compressing the secondary battery unit with a predetermined pressure; and
a housing accommodating the secondary battery unit and the compression plate, the housing including one or more fastening units corresponding to portions between the plurality of secondary batteries arranged in the first direction and protruding from a first surface of the housing and one or more fasteners fastened with the one or more fastening units by way of the portions between the plurality of secondary batteries arranged in the first direction while passing through the compression plate.

12. The battery module of claim 10, further comprising a fixing cover unit positioned between the secondary battery unit and the compression plate and covering the secondary battery unit to fix positions of the plurality of secondary batteries.

13. The battery module of claim 12, wherein the fixing cover unit comprises:

a top cover covering a top portion of the secondary battery unit and including a first barrier for separating the plurality of secondary batteries arranged in the first direction from each other by a predetermined distance;
a bottom cover covering a bottom portion of the secondary battery unit and including a second barrier for separating the plurality of secondary batteries arranged in the first direction from each other; and
a third barrier coupled between the top cover and the bottom cover and separating the plurality of secondary batteries arranged in the second direction from each other by a predetermined distance.

14. The battery module of claim 13, wherein the fastener comprises bolts and wherein bolt through holes through which the bolts pass are formed on a top portion of the compression plate, the first barrier, the second barrier and the third barrier, respectively, fastening unit through holes through which the bolt fastening units pass are formed on a bottom portion of the compression plate, and fastening unit insertion holes into which the bolt fastening units are inserted are formed on the second barrier.

15. The battery module of claim 10, wherein the compression plate comprises:
an upper compression plate compressing the secondary battery unit while covering a top portion of the secondary battery unit; and
a lower compression plate combined with the upper compression plate and compressing the secondary battery unit while covering a bottom portion of the secondary battery unit.

16. The battery module of claim 15, wherein the upper compression plate and the lower compression plate are welded at opposite ends of the secondary battery unit to then be combined with each other.

17. The battery module of claim 16, wherein opposite ends of the upper compression plate are stepwise bent, and opposite ends of the lower compression plate are welded to the opposite ends of the upper compression plate in a state in which the opposite ends of the lower compression plate are positioned at interior sides of the opposite ends of the upper compression plate.

18. The battery module of claim 10, wherein an adhesive layer for adhering the secondary battery unit combined with the compression plate to the housing is formed on a bottom surface of the housing.

19. The battery module of claim 18, wherein the adhesive layer is shaped of a line bent at least one time to maximize a contact area between the compression plate and the bottom surface of the housing.

20. The battery module of claim 11, further comprising a protection circuit unit electrically connected to the secondary battery unit, wherein the housing accommodates the protection circuit unit and includes aluminum.

* * * * *